US012767572B2

(12) United States Patent
Lee et al.

(10) Patent No.: US 12,767,572 B2
(45) Date of Patent: Oct. 20, 2026

(54) ULTRAPURE WATER MANUFACTURING FACILITY

(71) Applicant: Samsung Electronics Co., Ltd., Suwon-si (KR)

(72) Inventors: Younhaeng Lee, Incheon (KR); Cheolmin Shin, Iksan-si (KR); Seungyong Yang, Bucheon-si (KR); Wuyoung Choi, Hwaseong-si (KR); Changyeol Ham, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 516 days.

(21) Appl. No.: 18/111,160

(22) Filed: Feb. 17, 2023

(65) Prior Publication Data

US 2023/0264997 A1 Aug. 24, 2023

(30) Foreign Application Priority Data

Feb. 21, 2022 (KR) ........................ 10-2022-0022455

(51) Int. Cl.
*C02F 9/00* (2023.01)
*B01D 19/00* (2006.01)
(Continued)

(52) U.S. Cl.
CPC ............ *C02F 9/00* (2013.01); *B01D 19/0031* (2013.01); *B01D 61/026* (2022.08); *B01D 61/04* (2013.01);
(Continued)

(58) Field of Classification Search
CPC .............. C02F 2303/04; C02F 2303/10; C02F 2303/22; C02F 1/444; C02F 1/305;
(Continued)

(56) References Cited

U.S. PATENT DOCUMENTS 3,780,471 A * 12/1973 Ort ........................... C02F 3/32 47/1.4
5,811,012 A 9/1998 Tanabe et al.
(Continued)

FOREIGN PATENT DOCUMENTS

JP H06328070 A * 11/1994
JP 2021102200 A * 7/2021
(Continued)

OTHER PUBLICATIONS

El-Sheik et. al. "Recovery of vanadium and rare earth elements from the processed mineralized dolostone, GabalAllouga, Southwestern Sinai, Egypt". Australian Journal of Basic and Applied Sciences, 11(13) Oct. 2017, pp. 42-53. (Year: 2017).*
(Continued)

*Primary Examiner* — Liam Royce
(74) *Attorney, Agent, or Firm* — Muir Patent Law, PLLC

(57) ABSTRACT

An ultrapure water manufacturing facility includes: a first tank; a plurality of reverse osmosis membranes sequentially arranged downstream of the first tank; an electrodeionization device arranged downstream of the plurality of reverse osmosis membranes; an ion exchange resin tower arranged downstream of the electrodeionization device and filled with a boron selective resin; and a chemical supplier arranged between the plurality of reverse osmosis membranes and configured to supply a pH regulator to treatment-target water.

20 Claims, 3 Drawing Sheets

(51) Int. Cl.

| | |
|---|---|
| ***B01D 61/02*** | (2006.01) |
| ***B01D 61/04*** | (2006.01) |
| ***B01D 61/06*** | (2006.01) |
| ***C02F 1/00*** | (2023.01) |
| ***C02F 1/20*** | (2023.01) |
| ***C02F 1/32*** | (2023.01) |
| ***C02F 1/42*** | (2023.01) |
| ***C02F 1/44*** | (2023.01) |
| ***C02F 1/469*** | (2023.01) |
| ***C02F 1/66*** | (2023.01) |
| *C02F 101/10* | (2006.01) |
| *C02F 103/04* | (2006.01) |
| *C02F 103/34* | (2006.01) |

(52) U.S. Cl.

CPC ............ *B01D 61/06* (2013.01); *C02F 1/4695* (2013.01); *B01D 2311/04* (2013.01); *B01D 2317/02* (2013.01); *C02F 1/004* (2013.01); *C02F 1/20* (2013.01); *C02F 1/32* (2013.01); *C02F 1/42* (2013.01); *C02F 2001/427* (2013.01); *C02F 1/441* (2013.01); *C02F 1/66* (2013.01); *C02F 2101/108* (2013.01); *C02F 2103/04* (2013.01); *C02F 2103/346* (2013.01); *C02F 2301/046* (2013.01); *C02F 2301/08* (2013.01); *C02F 2303/04* (2013.01); *C02F 2303/10* (2013.01)

(58) Field of Classification Search

CPC .......... C02F 1/283; C02F 1/325; C02F 1/004; C02F 1/20; C02F 1/32; C02F 1/42; C02F 1/441; C02F 1/4695; C02F 1/66; C02F 2001/427; C02F 2101/108; C02F 2103/04; C02F 2103/346; C02F 2301/046; C02F 2301/08; C02F 9/00; B01D 19/0031; B01D 61/026; B01D 61/04; B01D 61/06; B01D 61/422; B01D 61/025; B01D 61/58; B01D 2311/04; B01D 2311/06; B01D 2311/12; B01D 2311/2649; B01D 2311/18; B01D 2311/2623; B01D 2317/02; B01D 2317/025

See application file for complete search history.

(56) References Cited

U.S. PATENT DOCUMENTS

| | | | | |
|---|---|---|---|---|
| 5,833,846 | A | 11/1998 | Tanabe et al. | |
| 6,464,867 | B1 * | 10/2002 | Morita .................... | C01B 13/10<br>210/765 |
| 7,699,968 | B2 * | 4/2010 | Osawa ................. | B01D 61/423<br>204/522 |
| 10,526,226 | B2 | 1/2020 | Ikuno | |
| 11,156,041 | B2 | 10/2021 | Posa | |
| 2010/0288308 | A1 | 11/2010 | Fukui et al. | |
| 2019/0352194 | A1 | 11/2019 | Thiers et al. | |
| 2021/0261445 | A1 | 8/2021 | Nakamura et al. | |

FOREIGN PATENT DOCUMENTS

| | | | |
|---|---|---|---|
| KR | 100185487 | B1 | 12/1998 |
| KR | 100462897 | B1 | 12/2004 |
| KR | 100626373 | B1 * | 9/2006 |
| KR | 1020200121279 | A | 10/2020 |

OTHER PUBLICATIONS

Office Action, dated Nov. 10, 2022, issued from the Korean Intellectual Property Office in corresponding KR Application No. 10-2022-0022455.

* cited by examiner

ULTRAPURE WATER MANUFACTURING FACILITY

CROSS-REFERENCE TO RELATED APPLICATION

This application is based on and claims priority under 35 U.S.C. § 119 to Korean Patent Application No. 10-2022-0022455, filed on Feb. 21, 2022, in the Korean Intellectual Property Office, the disclosure of which is incorporated by reference herein in its entirety.

BACKGROUND

The inventive concept relates to an ultrapure water treatment facility, and more particularly, to an ultrapure water manufacturing facility including an ion exchange resin tower, which is filled with a boron selective resin, and a chemical supplier for supplying a pH regulator.

Ultrapure water theoretically refers to water having a resistivity of 18 MΩ·cm or more. As the degree of integration of semiconductor devices increases, highly purified ultrapure water is required in semiconductor manufacturing processes. To this end, ultrapure water manufacturing facilities include reverse osmosis membranes, ion exchange resin towers, and the like. In general, ultrapure water manufacturing facilities mainly include pre-treatment facilities, primary treatment facilities, and secondary treatment facilities. However, ultrapure water manufacturing facilities including reverse osmosis membranes and ion exchange resin towers have drawbacks of high investment cost and high operating cost due to facility characteristics thereof.

SUMMARY

The inventive concept provides an ultrapure water manufacturing facility including an ion exchange resin tower and having improved efficiency by efficiently removing boron by using the ion exchange resin tower filled with a boron selective resin.

The inventive concept also provides an ultrapure water manufacturing facility, which is configured to treat water to be treated (hereinafter, referred to as treatment-target water) by adjusting a pH value of the treatment-target water by using a pH regulator and thus has improved efficiency.

According to an aspect of the inventive concept, there is provided an ultrapure water manufacturing facility including: a first tank; a plurality of reverse osmosis membranes sequentially arranged downstream of the first tank; an electrodeionization device arranged downstream of the plurality of reverse osmosis membranes; an ion exchange resin tower arranged downstream of the electrodeionization device and filled with a boron selective resin; and a chemical supplier arranged between the plurality of reverse osmosis membranes and configured to supply a pH regulator to treatment-target water.

According to another aspect of the inventive concept, there is provided an ultrapure water manufacturing facility including: a first tank; a heat exchanger arranged downstream of the first tank; a first filter and a second filter, which are sequentially arranged in the stated order downstream of the heat exchanger; a first reverse osmosis membrane arranged downstream of the second filter; a circulation unit including a first sub-tank and a first sub-reverse osmosis membrane, the circulation unit being configured to treat concentrated water of the first reverse osmosis membrane and circulate the concentrated water to the first tank; a second tank arranged downstream of the first reverse osmosis membrane; a first ultraviolet sterilizer arranged downstream of the second tank; a third filter arranged downstream of the first ultraviolet sterilizer; a second reverse osmosis membrane arranged downstream of the third filter; an electrodeionization device arranged downstream of the second reverse osmosis membrane; a third tank arranged downstream of the electrodeionization device; a second ultraviolet sterilizer arranged downstream of the third tank; an ion exchange resin tower arranged downstream of the second ultraviolet sterilizer and filled with a boron selective resin; a membrane degasifier arranged downstream of the ion exchange resin tower; and a chemical supplier configured to supply a pH regulator to treatment-target water flowing from the second tank to the first ultraviolet sterilizer.

According to yet another aspect of the inventive concept, there is provided an ultrapure water manufacturing facility including: a pre-treatment facility, which includes a first tank, a first reverse osmosis membrane arranged downstream of the first tank, and a circulation unit including a first sub-reverse osmosis membrane, the circulation unit being configured to treat concentrated water of the first reverse osmosis membrane and circulate the concentrated water to the first tank; a first make-up facility, which includes a second tank, a second reverse osmosis membrane arranged downstream of the second tank, an electrodeionization device arranged downstream of the second reverse osmosis membrane, and a chemical supplier configured to supply a pH regulator to treatment-target water flowing from the second tank to the second reverse osmosis membrane; a second make-up facility, which includes a third tank, an ion exchange resin tower arranged downstream of the third tank and filled with a boron selective resin, and a first degasifier arranged downstream of the ion exchange resin tower; and a polishing facility, which includes a fourth tank, a first polisher arranged downstream of the fourth tank, a second degasifier arranged downstream of the first polisher, a second polisher arranged downstream of the second degasifier, and a ultrafiltration membrane arranged downstream of the second polisher.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
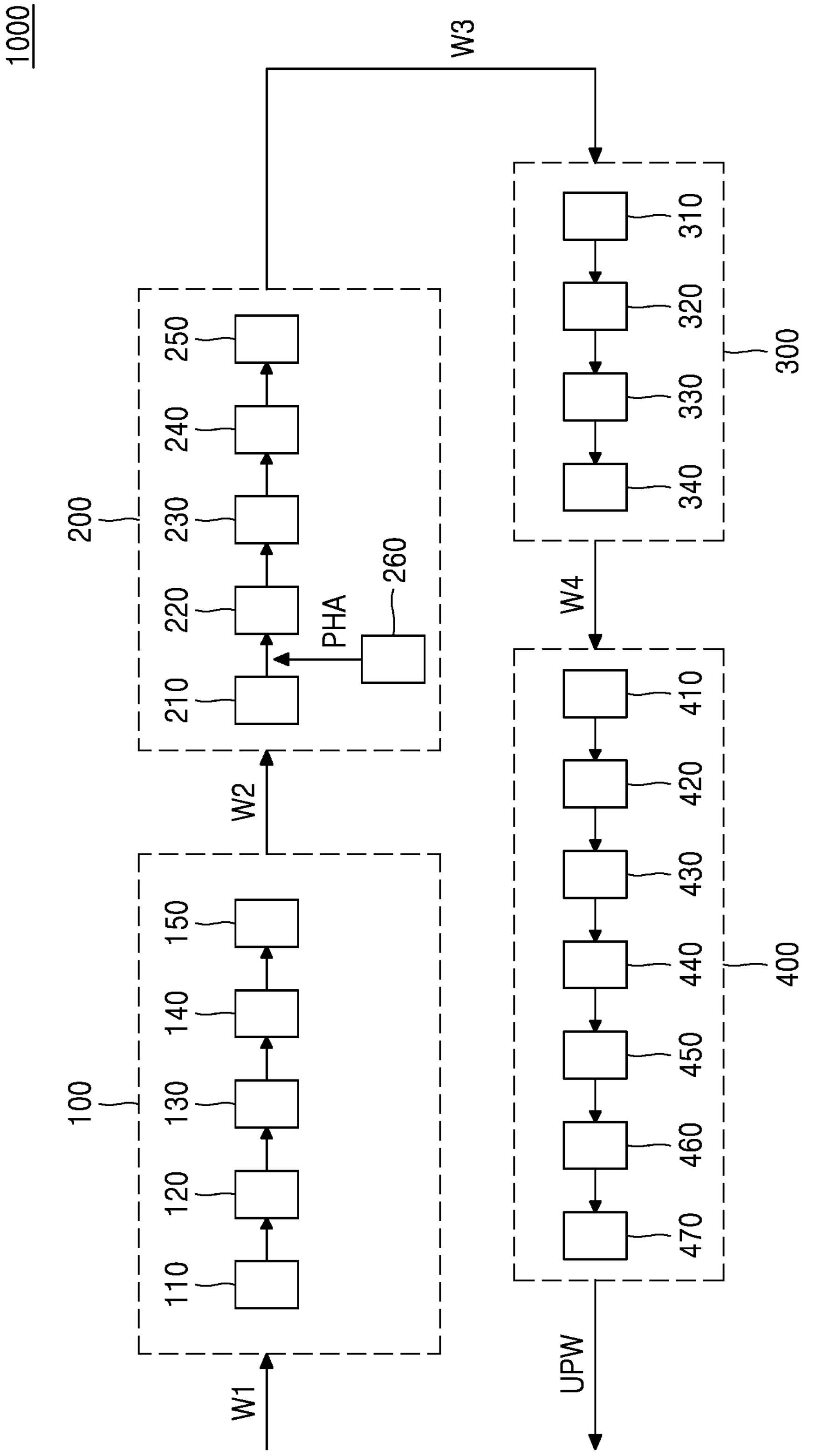
FIG. 1 is a block diagram illustrating an ultrapure water manufacturing facility according to an example embodiment of the inventive concept.

Hereinafter, embodiments of the inventive concept will be described in detail with reference to the accompanying drawings. Like components are denoted by like reference numerals throughout the specification, and repeated descriptions thereof are omitted.

FIG. 1 is a block diagram illustrating an ultrapure water manufacturing facility 1000 according to an example embodiment of the inventive concept.

Referring to FIG. 1, the ultrapure water manufacturing facility 1000 may include a pre-treatment facility 100, a first make-up facility 200, and a second make-up facility 300.

The pre-treatment facility 100 may include a first tank 110, a heat exchanger 120, a first filter 130, a second filter 140, and a first reverse osmosis membrane 150.

The first tank 110 may store first water W1 to be treated (hereinafter, referred to as first treatment-target water W1) for a certain time period. Accordingly, subsequent devices (for example, 120, 130, 140, and 150) included in the pre-treatment facility 100 may secure a time period for treating the first treatment-target water W1. For example, by storing the first treatment-target water W1 in the first tank 110, time for treating the first treatment-target water W1 in the subsequent devices (e.g., the heat exchanger 120, the first filter 130, the second filter 140, and the first reverse osmosis membrane 150) included in the pre-treatment facility 100 may be secured. The first treatment-target water W1 may include, for example, raw water RW (see FIG. 4) supplied from a water supply source, recycling water RWW (see FIG. 4), or a combination thereof. The pre-treatment facility 100 may further include a pump (not shown) downstream of the first tank 110. The first treatment-target water W1 stored in the first tank 110 may be moved to the heat exchanger 120 by the pump.

The heat exchanger 120 may be arranged downstream of the first tank 110. The heat exchanger 120 may adjust a temperature of the first treatment-target water W1 supplied from the first tank 110. For example, the heat exchanger 120 may increase or decrease the temperature of the first treatment-target water W1. Although one heat exchanger 120 is shown in FIG. 1, the inventive concept is not limited thereto. For example, there may be a plurality of heat exchangers 120, and each heat exchanger 120 may independently increase or decrease the temperature of the first treatment-target water W1.

The first filter 130 may be arranged downstream of the heat exchanger 120. The first filter 130 may remove minute particles, organic materials, chlorine, and the like included in the first treatment-target water W1 having passed through the heat exchanger 120. In an example embodiment, the first filter 130 may include an activated carbon filter (ACF). In this case, the first filter 130 may treat the first treatment-target water W1 by causing foreign materials in the first treatment-target water W1 to be adsorbed on activated carbon. However, the inventive concept is not limited thereto, and the first filter 130 may include, for example, an ultrafiltration membrane or a microfiltration membrane.

In an example embodiment, before the first treatment-target water W1 having passed through the first filter 130 is supplied to the second filter 140, a biocide may be provided to the first treatment-target water W1 having passed through the first filter 130. Microorganisms and the like in the first treatment-target water W1 having passed through the first filter 130 may be removed by the biocide.

The second filter 140 may be arranged downstream of the first filter 130. The second filter 140 may remove minute particles, organic materials, and the like remaining in the first treatment-target water W1 having passed through the first filter 130. In an example embodiment, the second filter 140 may include, but is not limited to, a prefilter.

Although one first filter 130 and one second filter 140 are shown in FIG. 1, the inventive concept is not limited thereto, and a plurality of first filters 130 and/or a plurality of second filters 140 may be provided. For example, the pre-treatment facility 100 may include one first filter 130 and a plurality of second filters 140.

In an example embodiment, before the first treatment-target water W1 having passed through the second filter 140 is supplied to the first reverse osmosis membrane 150, a scale inhibitor may be provided to the first treatment-target water W1 having passed through the second filter 140. Scale may be prevented by the scale inhibitor.

The first reverse osmosis membrane 150 may be arranged downstream of the second filter 140. The first reverse osmosis membrane 150 may remove ions, organic materials, and the like remaining in the first treatment-target water W1 having passed through the second filter 140. The first reverse osmosis membrane 150 may include, but is not limited to, for example, a cellulose triacetate-based asymmetric membrane, a polyamide-based, polyvinyl alcohol-based, or polysulfone-based composite membrane, or the like. The first reverse osmosis membrane 150 may have, but is not limited to, a shape, such as a flat sheet membrane, a spiral membrane, a tubular membrane, or a hollow fiber membrane. In an example embodiment, the first reverse osmosis membrane 150 may include a low-pressure reverse osmosis membrane having a standard operating pressure of about 1.47 MPa to about 5 MPa. For example, the first reverse osmosis membrane 150 may have a standard operating pressure of about 1.5 MPa. The pre-treatment facility 100 may further include a pump (not shown) upstream of the first reverse osmosis membrane 150. Pressure required by the first reverse osmosis membrane 150 may be provided by the pump.

The first treatment-target water W1 may pass through the pre-treatment facility 100 to become second water W2 to be treated (hereinafter, referred to as second treatment-target water W2), from which minute particles, ions, organic materials, and the like are removed, and the second treatment-target water W2 may be supplied to the first make-up facility 200 and additionally treated to remove ions, minute particles, organic materials, and the like remaining in the second treatment-target water W2.

Figure 2:
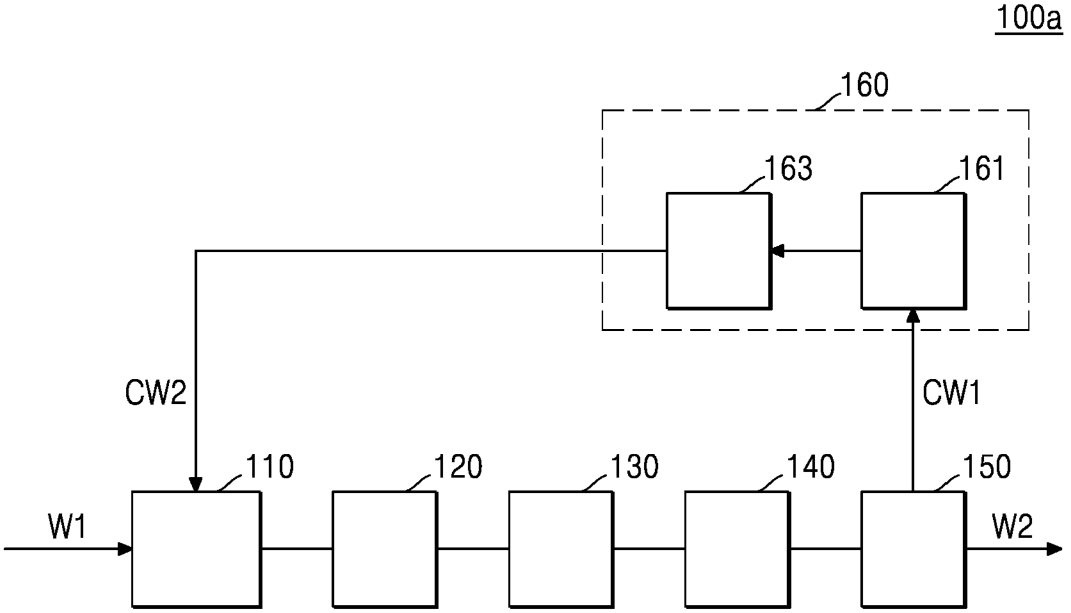
FIG. 2 is a block diagram illustrating a pre-treatment facility according to an example embodiment of the inventive concept.

FIG. 2 is a block diagram illustrating a pre-treatment facility 100*a* according to an embodiment of the inventive concept. Because respective components of the pre-treatment facility 100*a* shown in FIG. 2 are similar to the respective components of the pre-treatment facility 100 described with reference to FIG. 1, differences therebetween will be mainly described hereinafter.

Referring to FIG. 2, the pre-treatment facility 100*a* may include the first tank 110, the heat exchanger 120, the first filter 130, the second filter 140, the first reverse osmosis membrane 150, and a circulation unit 160 including a first sub-tank 161 and a first sub-reverse osmosis membrane 163. First concentrated water CW1 concentrated during the process, in which the first reverse osmosis membrane 150 filters the first treatment-target water W1, may be moved to and stored in the first sub-tank 161. The first concentrated water CW1 stored in the first sub-tank 161 may be treated by the first sub-reverse osmosis membrane 163. Some of organic materials, some of ions, and the like in the first concentrated water CW1 are treated and removed by the first sub-reverse osmosis membrane 163, whereby the first concentrated water CW1 becomes second concentrated water CW2. The second concentrated water CW2 may be circulated to the first tank 110 and thus pass through the heat exchanger 120, the first filter 130, the second filter 140, and the first reverse osmosis membrane 150 again, as described with reference to FIG. 1. When the pre-treatment facility 100*a* includes the circulation unit 160, the first concentrated water CW1 may be used instead of being discharged. In an example embodiment, the first sub-reverse osmosis membrane 163 may include a low-pressure reverse osmosis membrane having a standard operating pressure of about 1.47 MPa to about 5 MPa.

Referring again to FIG. 1, the first make-up facility 200 may include a second tank 210, a first ultraviolet sterilizer 220, a third filter 230, a second reverse osmosis membrane 240, an electrodeionization device 250, and a chemical supplier 260.

The second tank 210 may store second treatment-target water W2, which is treated by the pre-treatment facility 100, for a certain time period. Accordingly, subsequent devices (for example, 220, 230, 240, and 250) included in the first make-up facility 200 may secure a time period for treating the second treatment-target water W2. For example, by storing the second treatment-target water W2 in the second tank 210, time for treating the second treatment-target water W2 in the subsequent devices (e.g., the first ultraviolet sterilizer 220, the third filter 230, the second reverse osmosis membrane 240, and the electrodeionization device 250) included in the first make-up facility 200 may be secured. The first make-up facility 200 may further include a pump (not shown) downstream of the second tank 210. The second treatment-target water W2 stored in the second tank 210 may be moved to the first ultraviolet sterilizer 220 by the pump.

The first ultraviolet sterilizer 220 may be arranged downstream of the second tank 210. The first ultraviolet sterilizer 220 may perform ultraviolet sterilization such that the breeding of microorganisms in the second treatment-target water W2 may be suppressed. For example, the first ultraviolet sterilizer 220 may perform ultraviolet sterilization by irradiating the second treatment-target water W2 with ultraviolet light having a wavelength of about 254 nm.

The third filter 230 may be arranged downstream of the first ultraviolet sterilizer 220. The third filter 230 may remove minute particles, organic materials, and the like remaining in the second treatment-target water W2 having passed through the first ultraviolet sterilizer 220. The third filter 230 may include, but is not limited to, for example, a prefilter, an ultrafiltration membrane, or a microfiltration membrane.

The second reverse osmosis membrane 240 may be arranged downstream of the third filter 230. The second reverse osmosis membrane 240 may remove ions, organic materials, and the like remaining in the second treatment-target water W2 treated by the third filter 230. In addition, as described below, the second reverse osmosis membrane 240 may remove carbon dioxide in the second treatment-target water W2, to which a pH regulator PHA is supplied. In an example embodiment, the second reverse osmosis membrane 240 may include a low-pressure reverse osmosis membrane having a standard operating pressure of about 1.47 MPa to about 5 MPa. The first make-up facility 200 may further include a pump (not shown) upstream of the second reverse osmosis membrane 240. Pressure required by the second reverse osmosis membrane 240 may be provided by the pump. The second reverse osmosis membrane 240 may include, but is not limited to, for example, a cellulose triacetate-based asymmetric membrane, a polyamide-based, polyvinyl alcohol-based, or polysulfone-based composite membrane, or the like. The second reverse osmosis membrane 240 may have, but is not limited to, a shape, such as a flat sheet membrane, a spiral membrane, a tubular membrane, or a hollow fiber membrane.

The electrodeionization device 250 may be arranged downstream of the second reverse osmosis membrane 240. The electrodeionization device 250 may include a cathode, an anode, and cation exchange membranes and anion exchange membranes, which are alternately arranged between the cathode and the anode. The electrodeionization device 250 may include a dilute chamber, a concentrate chamber, and an electrolyte chamber, and the dilute chamber may be filled with a cation exchange resin and an anion exchange resin. A current may be applied to the cathode and the anode of the electrodeionization device 250, and thus, ions remaining in the second treatment-target water W2 passing through the dilute chamber may be removed. For example, the electrodeionization device 250 may remove boron ions such that a concentration of boron ions in third water W3 to be treated (hereinafter, referred to as treatment-target water W3) is about 30 ppt or less.

The chemical supplier 260 may supply the pH regulator PHA to the second treatment-target water W2, which is supplied from the second tank 210 toward the first ultraviolet sterilizer 220. The chemical supplier 260 may include, for example, a central chemical supply system (CCSS). In an example embodiment, the pH regulator PHA may include, but is not limited to, at least one alkaline reagent selected from NaOH, KOH, LiOH, tetramethylammonium hydroxide, and monoethanol. When the pH regulator PHA is supplied to the second treatment-target water W2, a pH value of the second treatment-target water W2 may be changed. For example, when NaOH as the pH regulator PHA is supplied to the second treatment-target water W2, the pH value of the second treatment-target water W2 may be increased. Hereinafter, removing carbon dioxide remaining in the second treatment-target water W2 by using a pH regulator will be described in detail with reference to FIG. 3.

Figure 3:
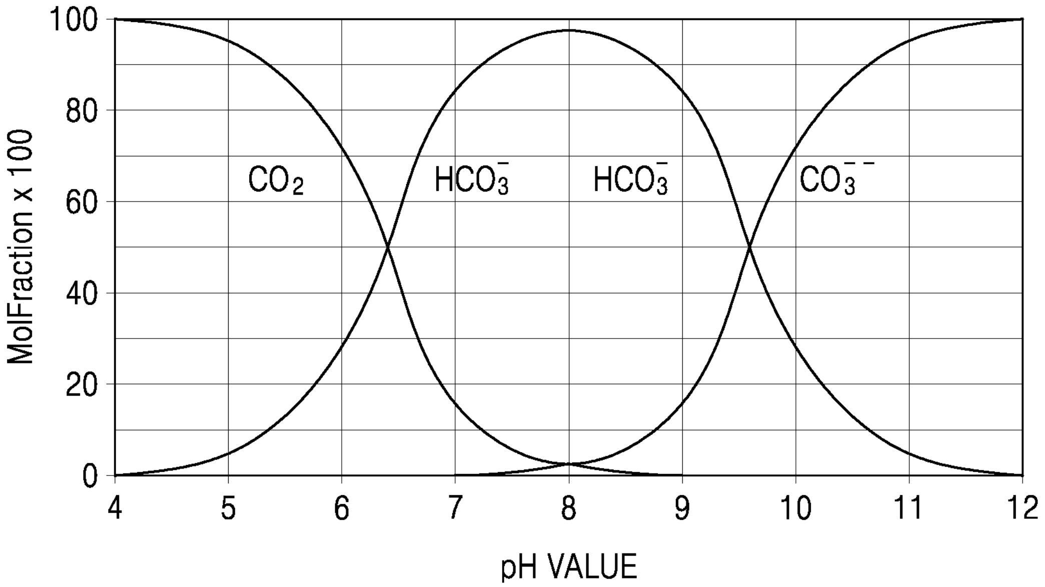
FIG. 3 is a graph depicting forms of carbon dioxide in treatment-target water according to a pH value of treatment-target water.

FIG. 3 is a graph depicting forms of carbon dioxide in treatment-target water according to a pH value of treatment-target water. The X axis of the graph represents a pH value of treatment-target water, and the Y axis of the graph represents a value obtained by multiplying 100 by a mole fraction of each form of carbon dioxide according to the pH value of the treatment-target water.

Referring to FIG. 3, when a pH value of treatment-target water is a general neutral pH value, most of carbon dioxide in the treatment-target water are present in the form of $HCO_3^-$, but when the pH value of the treatment-target water is about 5.5 or less, most of carbon dioxide dissolved is present in the form of $CO_2$ gas. Here, because the $CO_2$ gas form occupying most of carbon dioxide at a pH of 5.5 is difficult to remove by a reverse osmosis membrane, the number of degasifiers included in an ultrapure water manufacturing facility needs to be increased to remove the $CO_2$ gas form. Accordingly, the operating cost of the ultrapure water manufacturing facility is increased, and thus, the efficiency thereof deteriorates.

In contrast, in an example embodiment, when the pH value of the treatment-target water is about 7 to about 10 by supplying a pH regulator to the treatment-target water, most carbon dioxide in the treatment-target water is present in the form of $HCO_3^-$ and $CO_3^{2-}$. Accordingly, $HCO_3^-$ and $CO_3^{2-}$ in the treatment-target water may be removed well by a reverse osmosis membrane. In this case, because the number of degasifiers, which are included in the ultrapure water manufacturing facility, for removing $CO_2$ gas included in the treatment-target water may be reduced, the operating cost of the ultrapure water manufacturing facility including degasifiers in such a reduced number may be reduced, and the efficiency thereof may improve.

The second treatment-target water W2 may pass through the first make-up facility 200 to become the third treatment-target water W3, from which some of minute particles, ions, organic materials, and the like are removed, and the third treatment-target water W3 may be supplied to the second make-up facility 300 and undergo an additional treatment process.

The second make-up facility 300 may include a third tank 310, a second ultraviolet sterilizer 320, an ion exchange resin tower 330, and a first degasifier 340.

The third tank 310 may store the third treatment-target water W3 for a certain time period. Accordingly, subsequent devices (for example, 320, 330, and 340) included in the second make-up facility 300 may secure a time period for treating the third treatment-target water W3. For example, by storing the third treatment-target water W3 in the third tank 310, time for treating the third treatment-target water W3 in the subsequent devices (e.g., the second ultraviolet sterilizer 320, the ion exchange resin tower 330, and the first degasifier 340) included in the second make-up facility 300 may be secured. The second make-up facility 300 may further include a pump (not shown) downstream of the third tank 310. The third treatment-target water W3 stored in the third tank 310 may be moved to the second ultraviolet sterilizer 320 by the pump.

The second ultraviolet sterilizer 320 may be arranged downstream of the third tank 310. The second ultraviolet sterilizer 320 may suppress microorganisms in the third treatment-target water W3 and decompose organic materials remaining in the third treatment-target water W3. For example, the second ultraviolet sterilizer 320 may irradiate the third treatment-target water W3 with ultraviolet light having a wavelength of about 185 nm, and organic materials remaining in the third treatment-target water W3 may be decomposed into carbonic acid gas and an organic acid by the ultraviolet light.

The ion exchange resin tower 330 may be arranged downstream of the second ultraviolet sterilizer 320. The ion exchange resin tower 330 may remove ions remaining in the third treatment-target water W3. In an example embodiment, the ion exchange resin tower 330 may be filled with a boron selective resin. In an example embodiment, the boron selective resin may include a first repeating unit represented by Chemical Formula 1.

[Chemical Formula 1]

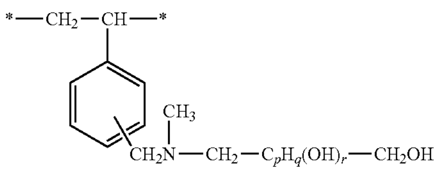

(in Chemical Formula 1, p is an integer of 2 to 10, $4 \le q+r \le 20$, and r is an integer of 2 to 10).

In an example embodiment, Chemical Formula 1 may be represented by Chemical Formula 2.

[Chemical Formula 2]

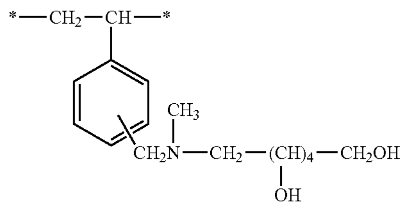

Because boron is weakly ionic and has low ion selectivity, boron is not removed well by a general ion exchange resin or a reverse osmosis membrane. In contrast, the ion exchange resin tower 330 according to an example embodiment of the inventive concept is filled with a boron selective resin, and the boron selective resin allows boron ions remaining in treatment-target water to be easily removed through a chemical reaction according to Reaction Formula 1.

[Reaction Formual 1]

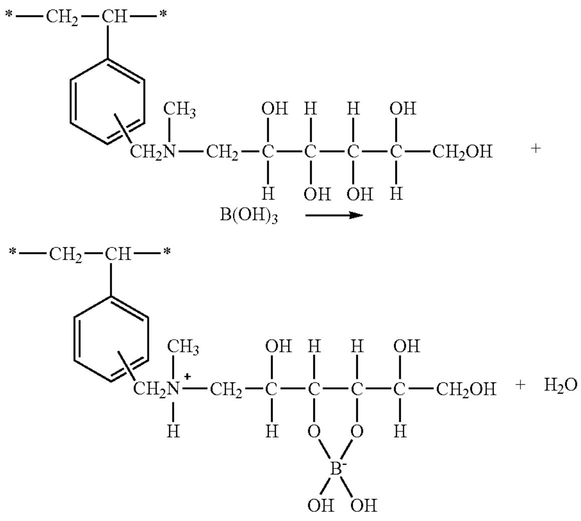

Accordingly, the number of electrodeionization devices required to remove boron may be reduced, and thus, the efficiency of the ultrapure water manufacturing facility 1000 including electrodeionization devices in such a reduced number may improve. In an example embodiment, the ion exchange resin tower 330 may include a non-regenerative ion exchange resin. Accordingly, amounts of harmful chemical materials, which are used to regenerate a regenerative ion exchange resin when the regenerative ion exchange resin is used, may be reduced, and thus, environmental issues may be improved.

In an example embodiment, the ion exchange resin tower 330 may be further filled with a mixed bed ion exchange resin. In this case, other ions remaining in the third treatment-target water W3, which passes through the ion exchange resin tower 330, may also be removed.

The first degasifier 340 may be arranged downstream of the ion exchange resin tower 330. The first degasifier 340 may remove $CO_2$ and dissolved oxygen, which remain in the third treatment-target water W3. In an example embodiment, the first degasifier 340 may include a membrane degasifier (MDG). In this case, the first degasifier 340 may include, but is not limited to, for example, a hollow fiber gas separation membrane.

The third treatment-target water W3 may pass through the second make-up facility 300 to become fourth treatment-target water W4, from which minute particles, ions, organic materials, and the like are removed, and the fourth treatment-target water W4 may be supplied to a polishing facility 400 and undergo an additional treatment process.

Referring to FIG. 1, the ultrapure water manufacturing facility 1000 may further include the polishing facility 400.

The polishing facility 400 may include a fourth tank 410, a heat exchanger 420, a third ultraviolet sterilizer 430, a first polisher 440, a second degasifier 450, a second polisher 460, and an ultrafiltration membrane 470.

The fourth tank 410 may store the fourth treatment-target water W4 for a certain time period. Accordingly, subsequent devices (for example, 420, 430, 440, 450, 460, and 470) included in the polishing facility 400 may secure a time period for treating the fourth treatment-target water W4. For example, by storing the fourth treatment-target water W4 in the fourth tank 410, time for treating the fourth treatment-target water W4 in the subsequent devices (e.g., the heat exchanger 420, the third ultraviolet sterilizer 430, the first polisher 440, the second degasifier 450, the second polisher 460, and the ultrafiltration membrane 470) included in the polishing facility 400 may be secured. The polishing facility 400 may further include a pump (not shown) downstream of the fourth tank 410. The fourth treatment-target water W4 stored in the fourth tank 410 may be moved to the heat exchanger 420 by the pump.

The heat exchanger 420 may be arranged downstream of the fourth tank 410. The heat exchanger 420 may be similar to the heat exchanger 120 of the pre-treatment facility 100 described with reference to FIG. 1. The heat exchanger 420 may adjust a temperature of the fourth treatment-target water W4 supplied from the fourth tank 410. For example, the heat exchanger 420 may increase or decrease the temperature of the fourth treatment-target water W4. Although one heat exchanger 420 is shown in FIG. 1, the inventive concept is not limited thereto. For example, there may be a plurality of heat exchangers 420, and each heat exchanger 420 may independently increase or decrease the temperature of the fourth treatment-target water W4.

The third ultraviolet sterilizer 430 may be arranged downstream of the heat exchanger 420. The third ultraviolet sterilizer 430 may be similar to the second ultraviolet sterilizer 320 of the second make-up facility described with reference to FIG. 1. The third ultraviolet sterilizer 430 may suppress microorganisms in the fourth treatment-target water W4 and decompose organic materials remaining in the fourth treatment-target water W4. For example, the third ultraviolet sterilizer 430 may irradiate the fourth treatment-target water W4 with ultraviolet light having a wavelength of about 185 nm, and organic materials remaining in the fourth treatment-target water W4 may be decomposed into carbonic acid gas and an organic acid by the ultraviolet light.

The first polisher 440 may be arranged downstream of the third ultraviolet sterilizer 430. In an example embodiment, the first polisher 440 may include an ion exchange resin tower filled with a catalyst ion exchange resin. In an example embodiment, the first polisher 440 may remove hydrogen peroxide included in the fourth treatment-target water W4. Hydrogen peroxide may be decomposed into water and oxygen by the catalyst ion exchange resin.

The second degasifier 450 may be arranged downstream of the first polisher 440. The second degasifier 450 may be similar to the first degasifier 340 of the second make-up facility 300 described with reference to FIG. 1. For example, the second degasifier 450 may remove $CO_2$ and dissolved oxygen, which remain in the fourth treatment-target water W4. In an example embodiment, the second degasifier 450 may include a membrane degasifier (MDG). The second degasifier 450 may include, but is not limited to, for example, a hollow fiber gas separation membrane.

The second polisher 460 may be arranged downstream of the second degasifier 450. In an example embodiment, the second polisher 460 may include a mixed bed ion exchange resin tower. In this case, the second polisher 460 may remove residual ions in the fourth treatment-target water W4, which passes through the second polisher 460.

The ultrafiltration membrane 470 may be arranged downstream of the second polisher 460. The ultrafiltration membrane 470 may remove various particles remaining in the fourth treatment-target water W4. The ultrafiltration membrane 470 may include, for example, a material selected from polysulfone, polypropylene, polyethylene, polyacrylonitrile, and polyamide. The ultrafiltration membrane 470 may have, for example, a hollow fiber shape, a tubular shape, or a flat plate shape, and may have pores having diameters of 0.01 μm or less. Various particles remaining in the fourth treatment-target water W4 are treated by the ultrafiltration membrane 470, whereby the fourth treatment-target water W4 having passed through the ultrafiltration membrane 470 becomes ultrapure water UPW.

Figure 4:
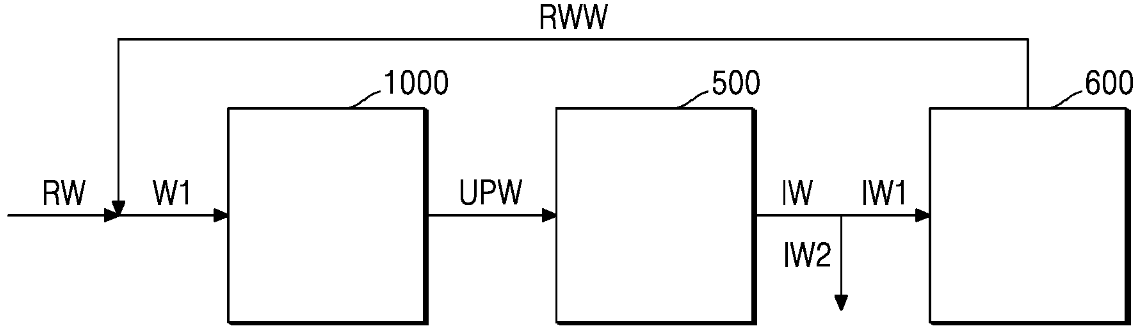
FIG. 4 is a block diagram illustrating a circulation process of ultrapure water manufactured by an ultrapure water manufacturing facility according to an example embodiment of the inventive concept.

FIG. 4 is a block diagram illustrating a circulation process of ultrapure water manufactured by an ultrapure water manufacturing facility according to an example embodiment of the inventive concept.

Referring to FIG. 4, the ultrapure water UPW manufactured by the ultrapure water manufacturing facility 1000 is provided to a semiconductor manufacturing facility 500. After use in the semiconductor manufacturing facility 500, the ultrapure water UPW supplied to the semiconductor manufacturing facility 500 includes various contaminants during a semiconductor manufacturing process and thus becomes industrial wastewater IW. The industrial wastewater IW may include first industrial wastewater IW1, which is circulated to the ultrapure water manufacturing facility 1000 through a recovery facility 600, and second industrial wastewater IW2, which is discharged to the outside through a separate purifier (not shown). The first industrial wastewater IW1 may be treated by the recovery facility 600 to become the recycling water RWW and thus be circulated to the ultrapure water manufacturing facility 1000. Hereinafter, the recovery facility 600 will be described with reference to FIG. 5.

Figure 5:
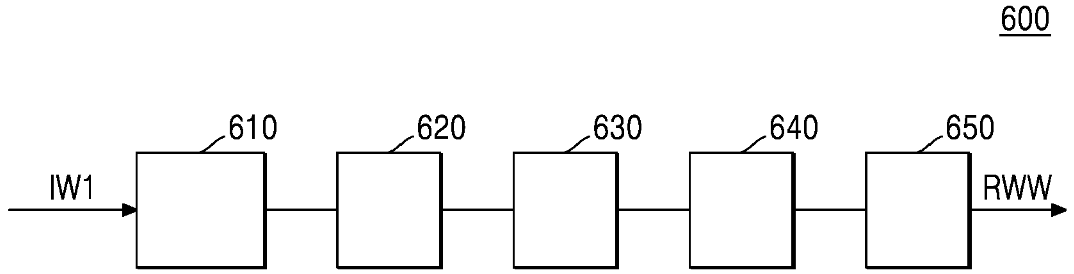
FIG. 5 is a block diagram illustrating a recovery facility according to an example embodiment of the inventive concept.

FIG. 5 is a block diagram illustrating a recovery facility according to an example embodiment of the inventive concept.

Referring to FIG. 5, the recovery facility 600 may include a fifth tank 610, a heat exchanger 620, a fourth filter 630, a fifth filter 640, and a third reverse osmosis membrane 650.

The fifth tank 610 may store the first industrial wastewater IW1. The first industrial wastewater IW1 stored in the fifth tank 610 may be moved to the heat exchanger 620. The heat exchanger 620 may be similar to the heat exchanger 120 of the pre-treatment facility 100 described with reference to FIG. 1. The heat exchanger 620 may adjust a temperature of the first industrial wastewater IW1 supplied from the fifth tank 610. For example, the heat exchanger 620 may increase or decrease the temperature of the first industrial wastewater IW1. Although one heat exchanger 620 is shown in FIG. 5, the inventive concept is not limited thereto. For example, there may be a plurality of heat exchangers 620, and each heat exchanger 620 may independently increase or decrease the temperature of the first industrial wastewater IW1.

The first industrial wastewater IW1 treated by the heat exchanger 620 may be sequentially moved to the fourth filter 630 and the fifth filter 640 in the stated order. Each of the fourth filter 630 and the fifth filter 640 may be independently similar to the first filter 130 or the second filter 140 of the pre-treatment facility 100 described with reference to FIG. 1. Minute particles, organic materials, chlorine, and the like included in the first industrial wastewater IW1 may be removed by the fourth filter 630 and the fifth filter 640. For example, one or both of the fourth filter 630 and the fifth filter 640 may remove minute particles, organic materials, chlorine, and the like included in the first industrial wastewater IW1 having passed through the heat exchanger 120. In an example embodiment, one or both of the fourth filter 630 and the fifth filter 640 may include an activated carbon filter (ACF). In this case, one or both of the fourth filter 630 and the fifth filter 640 may treat the first industrial wastewater IW1 by causing foreign materials in the first industrial wastewater IW1 to be adsorbed on activated carbon. However, the inventive concept is not limited thereto, and one or both of the fourth filter 630 and the fifth filter 640 may include, for example, an ultrafiltration membrane or a microfiltration membrane. As another example, one or both of the fourth filter 630 and the fifth filter 640 may include, for example, a prefilter.

The first industrial wastewater IW1 treated by the fourth filter 630 and the fifth filter 640 may be moved to the third reverse osmosis membrane 650. The third reverse osmosis membrane 650 may remove organic materials, ions, and the like in the first industrial wastewater IW1. The third reverse osmosis membrane 650 may include, for example, a low-pressure or high-pressure reverse osmosis membrane.

While the inventive concept has been particularly shown and described with reference to embodiments thereof, it will be understood that various changes in form and details may be made therein without departing from the spirit and scope of the following claims.

What is claimed is:

1. An ultrapure water manufacturing facility comprising:

a first tank;

a plurality of reverse osmosis membranes sequentially arranged downstream of the first tank, the plurality of reverse osmosis membranes comprising a first reverse osmosis membrane and a second reverse osmosis membrane downstream of the first reverse osmosis membrane;

a second tank downstream of the first reverse osmosis membrane;

a first ultraviolet (UV) sterilizer downstream of the second tank and upstream of the second reverse osmosis membrane;

an electrodeionization device arranged immediately downstream of the second reverse osmosis membrane;

an ion exchange resin tower arranged downstream of the electrodeionization device and filled with a boron selective resin; and a chemical supplier arranged between the plurality of reverse osmosis membranes and upstream of the first UV sterilizer, and configured to supply a pH regulator to treatment-target water flowing from the second tank to the first UV sterilizer.

2. The ultrapure water manufacturing facility of claim 1, wherein the pH regulator comprises at least one alkaline reagent selected from NaOH, KOH, and LiOH.

3. The ultrapure water manufacturing facility of claim 1, wherein a pH value of the treatment-target water, to which the pH regulator is supplied, ranges from about 7 to about 10.

4. The ultrapure water manufacturing facility of claim 1, wherein each of the first reverse osmosis membrane and the second reverse osmosis membrane comprises a low-pressure reverse osmosis membrane.

5. The ultrapure water manufacturing facility of claim 1, wherein the boron selective resin comprises a first repeating unit represented by Chemical Formula 1:

[Chemical Formula 1]

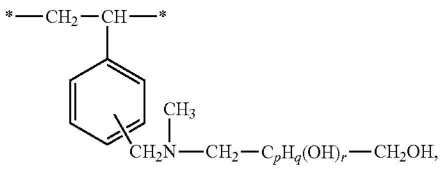

and wherein in Chemical Formula 1, p is an integer of 2 to 10, 4≤q+r≤20, and r is an integer of 2 to 10.

6. The ultrapure water manufacturing facility of claim 5, wherein Chemical Formula 1 is represented by Chemical Formula 2:

[Chemical Formula 2]

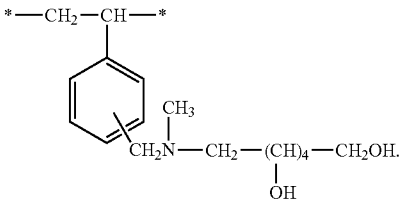

7. The ultrapure water manufacturing facility of claim 1, wherein the ion exchange resin tower is further filled with a mixed bed ion exchange resin.

8. The ultrapure water manufacturing facility of claim 1, further comprising a degasifier arranged downstream of the ion exchange resin tower.

9. The ultrapure water manufacturing facility of claim 8, wherein the degasifier comprises a membrane degasifier.

10. The ultrapure water manufacturing facility of claim 1, further comprising:

a circulation unit comprising a first sub-reverse osmosis membrane, wherein the circulation unit is configured to treat concentrated water of the plurality of reverse osmosis membranes and circulate the concentrated water to the first tank.

11. The ultrapure water manufacturing facility of claim 10, wherein the first sub-reverse osmosis membrane comprises a low-pressure reverse osmosis membrane.

12. An ultrapure water manufacturing facility comprising:

a first tank;

a heat exchanger arranged downstream of the first tank;

a first filter and a second filter, which are sequentially arranged in the stated order downstream of the heat exchanger;

a first reverse osmosis membrane arranged downstream of the second filter;

a circulation unit configured to circulate concentrated water output from the first reverse osmosis membrane to the first tank, the circulation unit comprising a first sub-tank configured to store the concentrated water output from the first reverse osmosis membrane and a first sub-reverse osmosis membrane configured to treat the concentrated water output from the first sub-tank;

a second tank arranged downstream of the first reverse osmosis membrane;

a first ultraviolet sterilizer arranged downstream of the second tank;

a third filter arranged downstream of the first ultraviolet sterilizer;

a second reverse osmosis membrane arranged downstream of the third filter;

an electrodeionization device arranged immediately downstream of the second reverse osmosis membrane;

a third tank arranged downstream of the electrodeionization device;

a second ultraviolet sterilizer arranged downstream of the third tank;

an ion exchange resin tower arranged downstream of the second ultraviolet sterilizer and filled with a boron selective resin;

a membrane degasifier arranged downstream of the ion exchange resin tower; and a chemical supplier configured to supply a pH regulator to treatment-target water flowing from the second tank to the first ultraviolet sterilizer.

13. The ultrapure water manufacturing facility of claim 12, wherein each of the first reverse osmosis membrane, the first sub-reverse osmosis membrane, and the second reverse osmosis membrane comprises a low-pressure reverse osmosis membrane.

14. The ultrapure water manufacturing facility of claim 12, wherein the pH regulator comprises NaOH, and wherein a pH value of the treatment-target water, to which the pH regulator is supplied, ranges from about 7 to about 10.

15. The ultrapure water manufacturing facility of claim 12, wherein the ion exchange resin tower is further filled with a mixed bed ion exchange resin.

16. The ultrapure water manufacturing facility of claim 12, wherein the first ultraviolet sterilizer irradiates ultraviolet light having a wavelength of 254 nm, and wherein the second ultraviolet sterilizer irradiates ultraviolet light having a wavelength of 185 nm.

17. An ultrapure water manufacturing facility comprising:

a pre-treatment facility, which comprises a first tank, a first reverse osmosis membrane arranged downstream of the first tank, and a circulation unit configured to circulate concentrated water output from the first reverse osmosis membrane to the first tank, the circulation unit comprising a first sub-tank configured to store the concentrated water output from the first reverse osmosis membrane and a first sub-reverse osmosis membrane configured to treat the concentrated water output from the first sub-tank;

a first make-up facility downstream of the pre-treatment facility, which comprises a second tank, a second reverse osmosis membrane arranged downstream of the second tank, an electrodeionization device arranged immediately downstream of the second reverse osmosis membrane, and a chemical supplier configured to supply a pH regulator to treatment-target water flowing from the second tank to the second reverse osmosis membrane;

a second make-up facility, which comprises a third tank, an ion exchange resin tower arranged downstream of the third tank and filled with a boron selective resin, and a first degasifier arranged downstream of the ion exchange resin tower; and a polishing facility, which comprises a fourth tank, a first polisher arranged downstream of the fourth tank, a second degasifier arranged downstream of the first polisher, a second polisher arranged downstream of the second degasifier, and an ultrafiltration membrane arranged downstream of the second polisher.

18. The ultrapure water manufacturing facility of claim 17, wherein each of the first reverse osmosis membrane, the first sub-reverse osmosis membrane, and the second reverse osmosis membrane comprises a low-pressure reverse osmosis membrane.

19. The ultrapure water manufacturing facility of claim 17, wherein the boron selective resin comprises a first repeating unit represented by Chemical Formula 3:

[Chemical Formula 3]

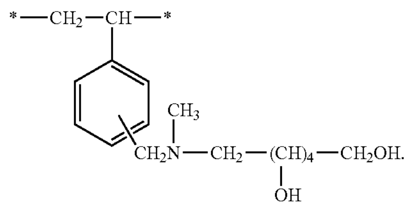

20. The ultrapure water manufacturing facility of claim 17, wherein the first polisher comprises an ion exchange resin tower filled with a catalyst ion exchange resin, and wherein the second polisher comprises a mixed bed ion exchange resin tower.

* * * * *